(12) United States Patent
Lepaule

(10) Patent No.: US 6,502,799 B2
(45) Date of Patent: Jan. 7, 2003

(54) VEHICLE SEAT COMPRISING A HEIGHT-ADJUSTING MECHANISM, AND A CONTROL DEVICE FOR SUCH A SEAT

(76) Inventor: Franck Lepaule, 2 rue de Messei, 61100 Flers (FR)

( * ) Notice: Subject to any disclaimer, the term of this patent is extended or adjusted under 35 U.S.C. 154(b) by 40 days.

(21) Appl. No.: 09/804,134

(22) Filed: Mar. 12, 2001

(65) Prior Publication Data

US 2001/0035673 A1 Nov. 1, 2001

(30) Foreign Application Priority Data

Mar. 22, 2000 (FR) .............................................. 00 03649

(51) Int. Cl.[7] .............................................. F16M 13/00
(52) U.S. Cl. ..................... 248/423; 248/396; 296/65.05
(58) Field of Search .............................. 248/125.2, 422, 248/423, 421, 548, 396, 398, 395; 296/65.05, 65.07, 687.1, 344.15

(56) References Cited

U.S. PATENT DOCUMENTS

| 4,128,225 A | * | 12/1978 | Kluting et al. ............... 248/421 |
| 4,387,874 A | | 6/1983 | Boisset ........................ 248/396 |
| 4,422,611 A | * | 12/1983 | Kitsuda ....................... 248/394 |
| 4,568,053 A | | 2/1986 | Strowik et al. ............. 248/396 |
| 4,632,353 A | * | 12/1986 | Mattson ....................... 248/396 |
| 4,767,157 A | * | 8/1988 | Kazaoka et al. ............. 248/397 |
| 5,533,703 A | * | 7/1996 | Grassl et al. ................ 248/421 |
| 5,568,908 A | * | 10/1996 | Kisiel .......................... 248/394 |
| 5,882,061 A | | 3/1999 | Guillouet .................. 296/65.05 |
| 5,884,972 A | * | 3/1999 | Deptolla ................. 297/216.14 |
| 6,250,705 B1 | * | 6/2001 | Zuch ........................... 248/422 |
| 6,276,650 B1 | * | 8/2001 | Kojima et al. .............. 248/421 |

FOREIGN PATENT DOCUMENTS

| DE | 197 58 237 | 7/1998 |
| FR | 2 616 719 | 12/1988 |
| FR | 2 772 317 | 6/1999 |

OTHER PUBLICATIONS

Search Report issued by the French Patent Office for parent French Application No. 00 03649 filed on Mar. 22, 2000; report dated Dec. 1, 2000.

* cited by examiner

*Primary Examiner*—Anita King
*Assistant Examiner*—A. Joseph Wujciak, III

(57) ABSTRACT

Vehicle seat provided with a height-adjusting mechanism comprising a link connected to a rack which is pivotally mounted to the seat cushion and has a circular toothed section meshing with a pinion mounted to the cushion by means of a rigid yoke the plates of which are guided without free play by arcuate guides formed by the rack, a part of the yoke engaging in an arcuate slot formed in the rack.

12 Claims, 4 Drawing Sheets

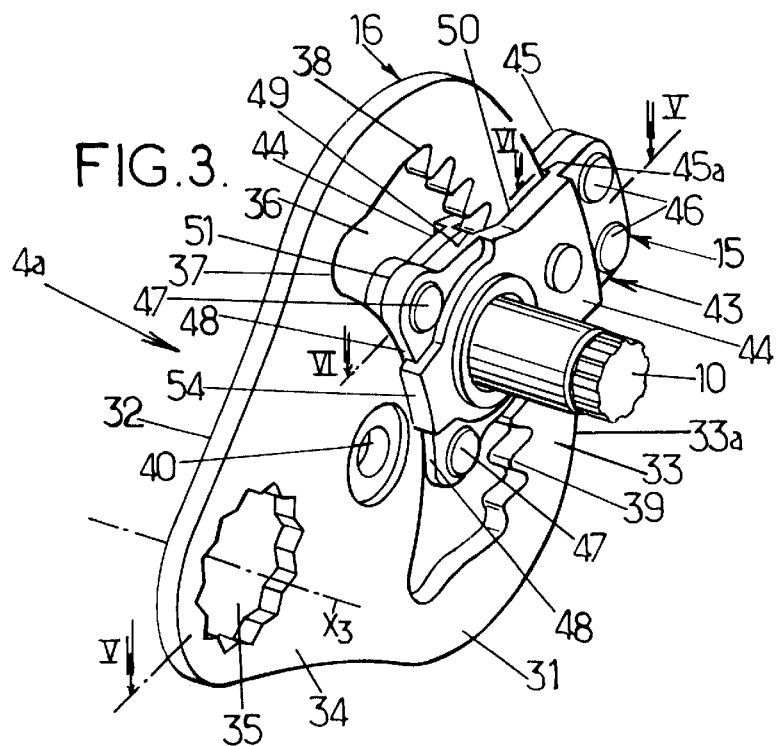
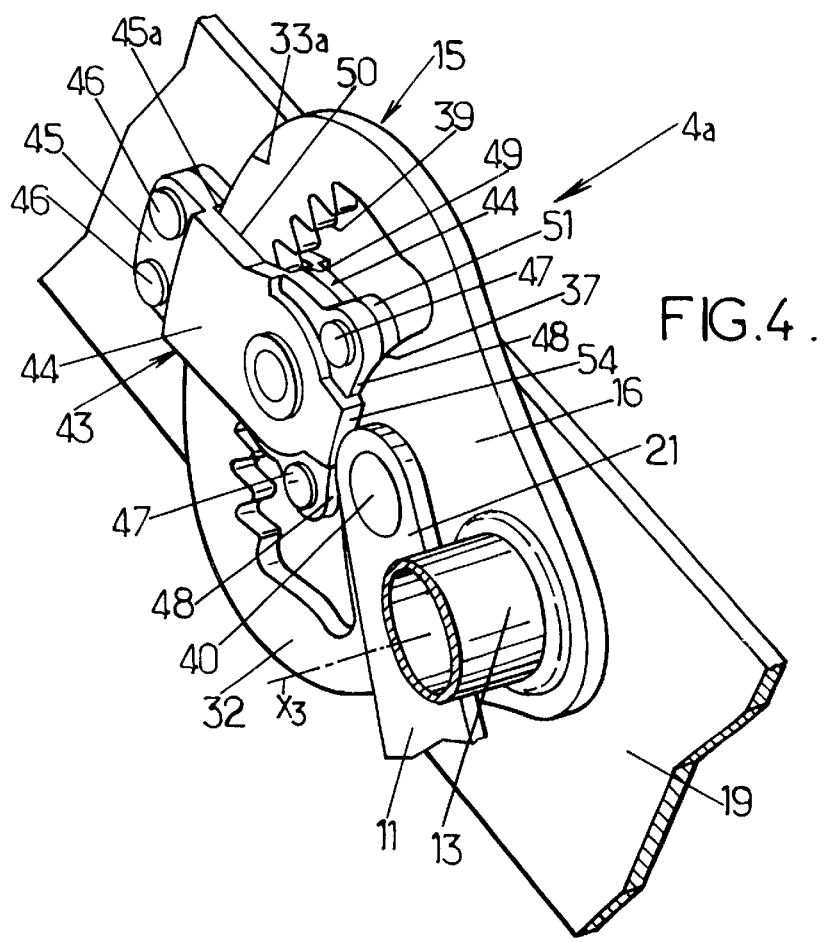

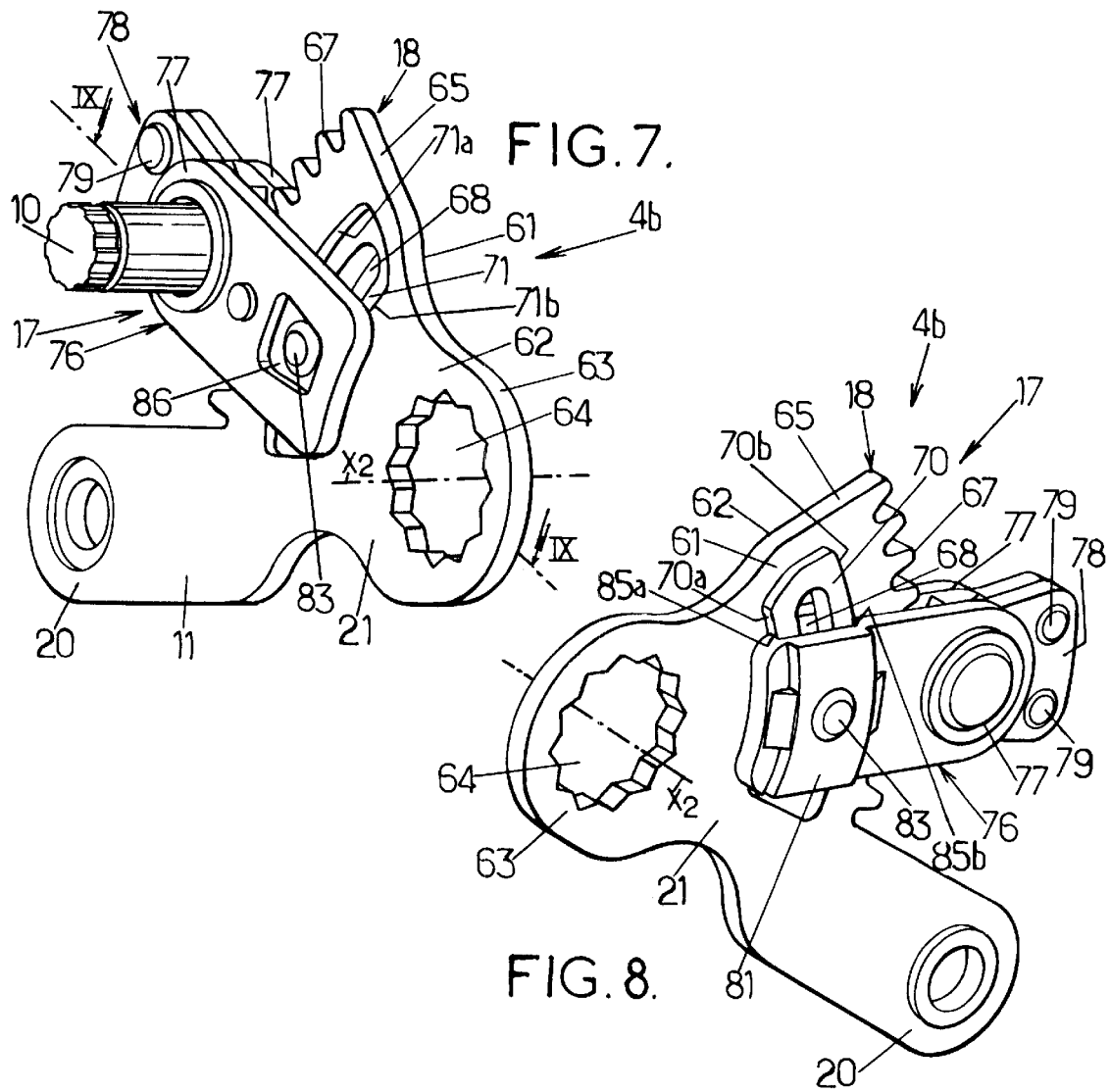
FIG. 7.
FIG. 8.
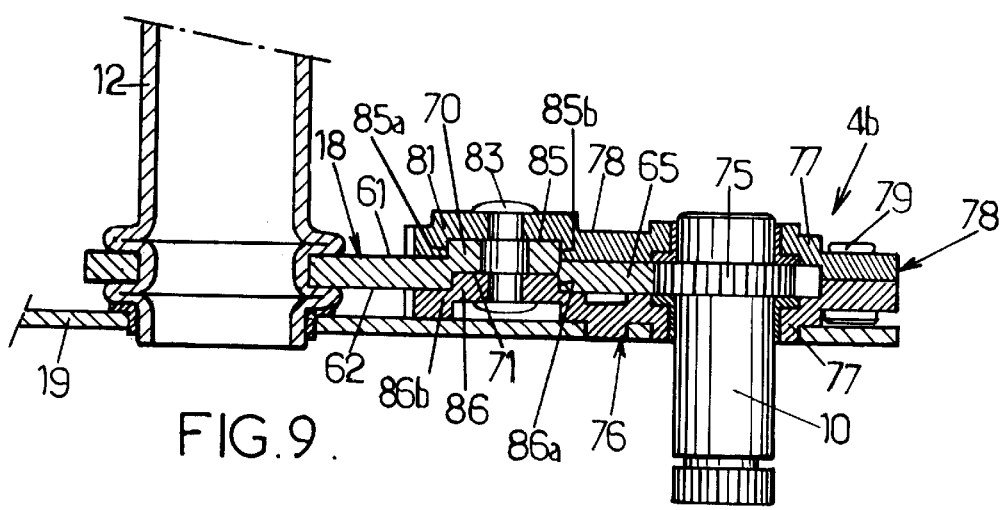
FIG. 9.

VEHICLE SEAT COMPRISING A HEIGHT-ADJUSTING MECHANISM, AND A CONTROL DEVICE FOR SUCH A SEAT

FIELD OF THE INVENTION

The present invention relates to motor vehicle seats including a height-adjusting mechanism, and to control devices for such seats.

More particularly, the invention concerns a vehicle seat comprising a seat part supported by a height-adjusting mechanism for adjusting the height of the cushion, the height-adjusting mechanism comprising:

- at least one link member extending between, firstly, a first end adapted to be pivotally mounted in relation to the vehicle floor around a first pivot axis and, secondly, a second end connected to the seat part,
- at least one control device comprising, firstly, a pinion which is rotatably mounted with respect to the seat part around an axis of rotation parallel to the first pivot axis, and, secondly, a rack which is pivotally mounted with respect to the seat part around a second pivot axis parallel to the first pivot axis, said rack being formed by a rigid plate having two principal faces perpendicular to the second pivot axis, said rack comprising a toothed section forming an arc of a circle centered on said second pivot axis and meshing with the pinion, and the rack being mechanically connected to the second end of the link member so that rotation of the rack around the second pivot axis is translated into rotation of the link around the first pivot axis.

BACKGROUND OF THE INVENTION

Known seats of this type are generally satisfactory with regard to their operation under normal conditions, but present a risk of the pinion becoming disengaged from the rack when the vehicle is subjected to a violent shock in an accident. In that case, the control device violently releases the height-adjusting mechanism, so that the seat cushion is no longer suitably restrained by the vehicle floor, giving rise to risk of serious injury to the seat occupant.

OBJECTS AND SUMMARY OF THE INVENTION

The objective of the present invention is, in particular, to mitigate these disadvantages.

To meet this objective, according to the invention, the pinion is rotatably mounted inside a rigid yoke formed integrally with the seat cushion and comprising two rigid plates connected by a web, said two plates encasing the pinion substantially without free play along the second pivot axis and being arranged respectively against the two main faces of the rack, substantially without free play along said second pivot axis, in that each of the two plates has first and seconds end arranged on either side of the pinion, the first ends of the two plates being rigidly connected by mutual contact, outside the rack, to form the web of the yoke, and the second ends of the plates being connected by at least one fixing element passing through a slot forming an arc of a circle in the rack and centered on the second pivot axis, and in that the yoke has at least one stop which abuts radially on an arcuate abutment edge (arcuate meaning hereinafter: forming an arc of a circle) centered on said second pivot axis and formed in the rack, said abutment edge facing away from the toothed section of the rack.

As a result of these arrangements, the pinion is held in engagement with the rack in a particularly reliable way by the rigid yoke linking these two parts. This linkage is all the more reliable and robust because it is formed by only one intermediate part, i.e. the rigid yoke, over a generally short distance between the toothed section of the rack and the arcuate abutment edge of said rack, at the same time allowing the play between the pinion and the rack to be minimized and all intermediate parts which might reduce the mechanical strength of the assembly to be eliminated. In addition, if appropriate, the rigid yoke can be formed in a particularly compact manner, limiting both the weight and the cost of the height-adjusting mechanism.

In preferred embodiments, one and/or the other of the following arrangements could be used:

- the second end of the link member is integral with the rack;
- the second end of the link member is mounted pivotally on the rack;
- the stop has an arcuate form complementary to that of the abutment edge;
- each plate rests against the corresponding main face of the rack on either side of the slot in said rack;
- the slot in the rack has a smooth arcuate edge forming said abutment edge, the second ends of the plates being in mutual contact and forming a rigid guide block engaging in said slot, this guide block having an outside edge forming said stop;
- the slot in the rack is delimited between the abutment edge and the toothed section of said rack;
- the slot in the rack has one edge which faces towards the second pivot axis and in which the teeth of said rack are formed, said rack having an outer edge forming said abutment edge, and the web of the yoke having an inner edge forming said stop;
- the toothed section of the rack projects radially towards the outside of said rack, the rack having a recess forming an arcuate groove centered on the second pivot axis in one main face of the rack and an arcuate rib centered on the second pivot axis on the opposite main face of said rack, the second end of one of the plates having a relief projecting into the groove of the rack and resting radially at least against one edge delimiting said groove and facing away from the toothed section of the rack, and the second end of the other plate having an arcuate channel centered on the second pivot axis, said arcuate channel having one arcuate edge facing towards the toothed section of the rack and resting radially against an edge delimiting said rib, which edge of the rib faces away in from the toothed section of the rack;
- the arcuate slot is formed in the recess of the rack; and
- the height-adjusting mechanism comprises at least one transverse linking bar extending between first and second ends which are pivotally mounted on two lateral plates forming part of the cushion, the first end being integral with said rack and the second end being integral with an additional link which is intended to be mounted pivotally to the floor of the vehicle.

BRIEF DESCRIPTION OF THE DRAWINGS

A further object of the invention is to provide a control device for a seat as defined above, comprising at least the rack, the pinion and the yoke.

Further characteristics and advantages of the invention will appear in the course of the following description of one of its embodiments, given as a non-limiting example, with reference to the attached drawings in which:

FIGS. 3 and 4 are partial detail perspective views showing the front height-adjusting mechanism of FIG. 2, seen respectively in directions III and IV of FIG. 2;

FIGS. 7 and 8 are partial detail perspective views showing the rear height-adjusting mechanism of FIG. 2, in directions VII and VIII of FIG. 2 respectively; and FIG. 9 is a sectional view along line IX—IX of FIG. 7.

MORE DETAILED DESCRIPTION

In the different drawings, the same reference numbers refer to identical or similar elements.

Figure 1:
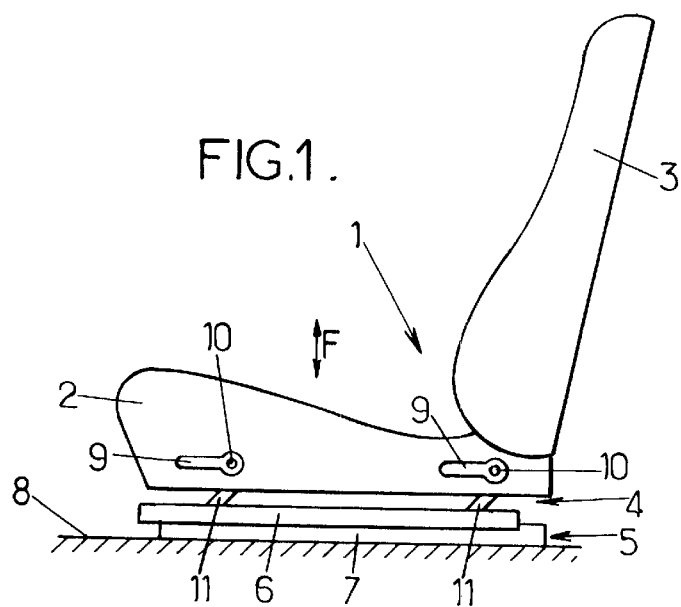
FIG. 1 is a schematic view of a seat which can be fitted with a height-adjusting mechanism according to the invention.

FIG. 1 shows a seat 1 of a motor vehicle comprising a cushion (seat part) 2 supporting a backrest 3 and itself supported by a height-adjusting mechanism 4 according to the present invention.

The height-adjusting mechanism 4 is mounted on the moving profile sections 6 of two longitudinal slides 5, only one of which is visible in FIG. 1, the two fixed profile sections 7 being integrally connected to the floor 8 of the vehicle.

Figure 2:
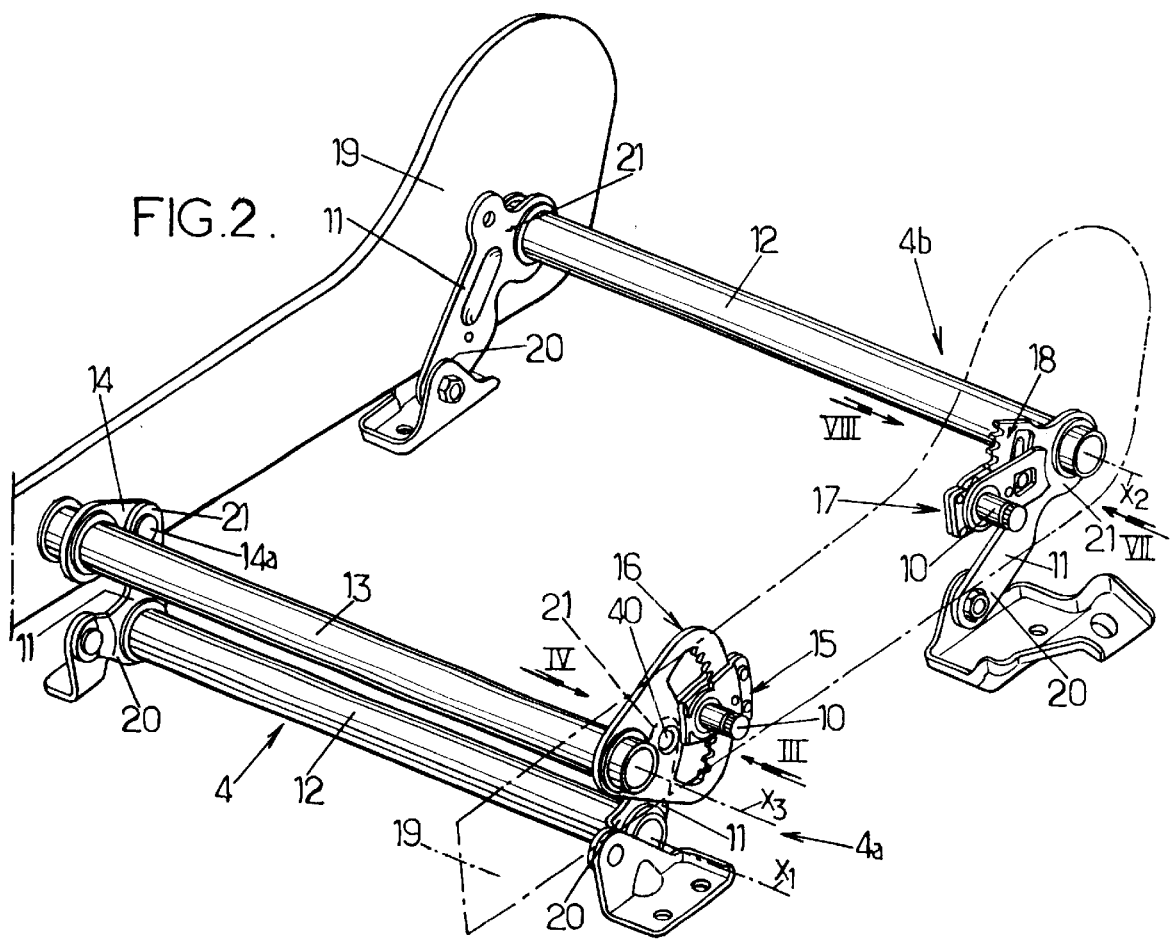
FIG. 2 is a perspective view of the height-adjusting mechanism of the seat in FIG. 1, comprising a front height-adjusting mechanism according to a first embodiment of the invention and a rear height-adjusting mechanism according to a second embodiment of the invention.
Figure 5:
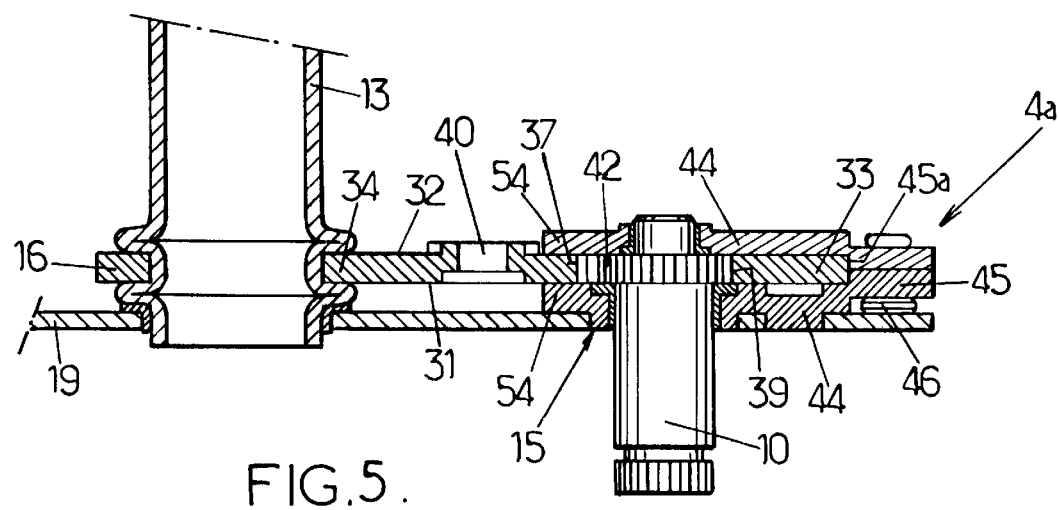
FIGS. 5 and 6 are sectional views along lines V—V and VI—VI of FIG. 3 respectively.
Figure 6:
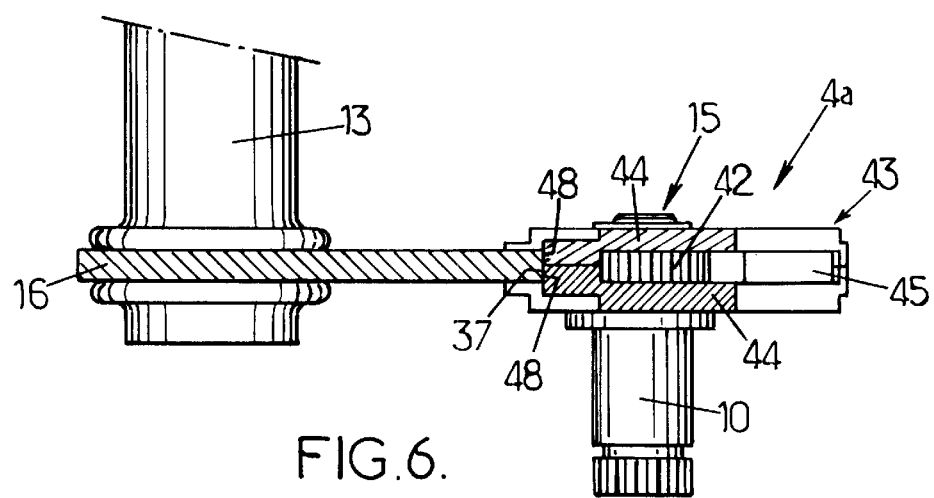

The height-adjusting mechanism 4 comprises two hand levers 9 (one front lever and one rear lever) each of which is movable around a transverse horizontal axis 10 and controls the pivoting of metal links 11, the lower ends 20 of which are mounted pivotally to moving profile section 6 of the corresponding slide and the upper ends 21 of which are connected directly or otherwise to rigid plates 19 at the sides of the cushion, as shown in FIG. 2.

The links 11 are generally four in number and are arranged in two pairs, situated respectively at the rear of the seat and the front of the seat and forming a front height-adjusting mechanism 4a and a rear height-adjusting mechanism 4b, which together form the height-adjusting mechanism 4.

It will be noted that the front and rear height-adjusting mechanisms are different from each other in the example shown in the drawings, but could, if appropriate, be identical. It would also be possible for only one of the front and rear height-adjusting mechanisms, for example the rear mechanism, to be positively controlled by an element actuated by the user: in this case, the other height-adjusting mechanism, for example the front mechanism, would be fitted only with two links 11 or with another mechanical device allowing the front of the seat to follow the vertical displacement of the rear of the seat.

It will also be noted that the rear height-adjusting mechanism 4b and the front height-adjusting mechanism 4a could be reversed if appropriate.

The two links 11 of each pair are integrally connected by a transverse linking tube 12 made of metal, generally steel, these two tubes extending along transverse horizontal axes X1, X2 respectively.

Height-adjusting mechanism 4a also includes an additional metal linking tube 13 extending along a horizontal transverse axis X3 and having its ends mounted pivotally to the side plates 19 of the seat cushion.

One of the ends of linking tube 13 is also integrally connected to a rack 16 forming part of the control mechanism 15 actuated by the corresponding lever 9. The rack 16 is mounted pivotally on the upper end of the corresponding link 11 around a pivot 40, while the upper end 21 of the other link 11 is mounted pivotally on an additional link 14 around a pivot 14a, this additional link being itself connected integrally to the end of tube 13 which is arranged opposite the control mechanism 15.

As is shown particularly in FIGS. 3 to 6, the rack 16 of the front height-adjusting mechanism 4a is formed by a rigid metal plate formed as a circular sector centered on axis X3 of transverse tube 13 and arranged in a plane perpendicular to said axis X3.

Rack 16 has two main faces 31, 32, and includes a widened rear portion 33 and a pointed front portion 34, transverse tube 13 passing through this front portion 34.

In order to position rack 16 on transverse tube 13, the front portion 34 of this rack has a notched hole 35 in which tube 13 is fixed by crimping, as taught, for example, in document FR-A-2 772 317. In its widened rear part 33 plate 30 includes a slot 36 the edges 37 and 38 of which are circular and are centered on axis X3, edge 37 being smooth and edge 38 forming a toothed circular section 39 facing towards the inside of slot 36. Pivot 40 is situated, for example, between hole 35 and slot 36.

In addition, control mechanism 15 includes a pinion 42 which meshes with toothed section 39, this pinion being integral with the corresponding axle 10 and being centered on this axle. Pinion 42 is mounted rotatably in a rigid metal yoke 43 which comprises two parallel plates 44 arranged on either side of rack 16 and pinion 42, these plates 44 being connected by a web 45.

Web 45 of the yoke is formed by the rear ends of plates 44, which are cranked towards each other and are held in contact by means of rivets 46.

In addition, the front ends of plates 44 of the yoke are also cranked and held in contact by rivets 47 or by other fixing means, to form a guide block 51 which passes through slot 36 and has two lateral front portions each forming a stop 48. Each stop 48. preferably has the form on an arc of a circle centered on axis X3 and rests radially against the circular smooth edge 37 of slot 36, so as to guarantee that pinion 42 remains meshed with toothed section 39.

It will be noted that the inner shoulders 45a formed by the two plates 45 at the web 45 also form an arcuate stop centered on axis X3, which contributes to ensuring that pinion 42 remains meshed with toothed section 39 by abutting against the circular rear edge 33a of rack 16, which is also centered on axis X3, or at least by being in the immediate proximity of this rear edge.

Guide block 51 also forms lateral shoulders 49 facing towards toothed section 39, so that the yoke forms an arcuate channel 50 between shoulders 49 and 45a enclosing the part of rack 16 located between slot 36 and rear edge 33a.

In addition, to retain pinion 42 in the plane of rack 16, plates 44 of yoke 43 are in contact with the two main faces 31, 32 respectively of rack 16, substantially without free play along axis X3.

Preferably, plates 44 rest against the main faces 31, 32 of rack 16 not only towards the rear end of yoke 43, but also by the intermediary of lugs 54 forming the front end of the yoke.

Finally, rigid yoke 43 is fixed by welding or other means to the corresponding side plate 19 of the seat cushion, so that when corresponding lever 9 is turned, the rotation of pinion 42 causes of rack 16 to pivot around axis X3, which movement also causes the two links 11 of the front height-adjusting mechanism 4a to pivot, raising or lowering the front part of the seat cushion in the direction of double arrow F (FIG. 1).

In addition, as shown in FIG. 2, transverse tube 12 of height-adjusting mechanism 4b is integrally connected to the upper ends of rear links 11 and is pivotally mounted on side plates 19 of the seat cushion, around axis X2. On one side of the seat this rear height-adjusting mechanism includes a control device 17 which is moved by axle 10 of corresponding lever 9 and includes a rack 18.

As shown in FIGS. 7 to 9, rack 18 preferably has the form of a metal plate advantageously formed in one piece with corresponding link 11 and having two main faces 61, 62 perpendicular to axis X2. Rack 18 has substantially the form of an angular sector centered on axis X2 and has a notched hole 64 level with its pointed rear end 63, in which hole transverse tube 12 is crimped. Rack 18 has a form widening towards the front from its rear end 63 to a wide front end 65 which ends in an arcuate toothed section 67 facing towards the front and centered on axis X2.

In its widened portion 65, rack 18 has an arcuate slot 68 centered on axis X2.

In addition, the periphery of slot 68 is dished to form:
two arcuate ribs 70 projecting from main face 61 of the rack,
and two arcuate grooves 71 formed in the opposite main face 62.

As previously, control mechanism 17 has a pinion 75 rotatably driven by the transverse axle 10 of corresponding lever 9 and pivotally mounted in a rigid metal yoke 76 which has two plates 77 connected by a web 78. In the example shown, the two metal plates 77 are cranked towards each other and held in contact by rivets 79 or other means at their front end, to form the web 78 of the yoke.

In addition, plates 77 are connected to each other at their rear ends, by a rivet 83 passing through slot 68 of the rack.

In addition, each of the plates 77 of the yoke rests against one of the main faces 61, 62 of the rack, on either side of the dished portion of the rack forming rib 70 and groove 71.

On its side resting against rack 18, one of the plates 77 has a dished portion 81 forming an arcuate channel 85 projecting outwardly and downwardly outside yoke 76, and straddling rib 70 of the yoke. This channel 85 is delimited by two arcuate shoulders 85a and 85b which slide radially against the arcuate edges 70a and 70b formed by rib 70.

Similarly, the other plate 77 of the yoke has a pressed boss 86 engaging in groove 71 of the rack. This boss 86 has two arcuate shoulders 86a, 86b centered on axis X2 and sliding radially against edges 71a, 71b of groove 71.

Finally one of the plates 77 of the yoke is fixed by welding or other means to corresponding plate 19 of the seat cushion, so that when the rear lever 9 is actuated, rack 18 pivots around axis X2 and the rear of the cushion is displaced vertically in direction F of FIG. 1.

In this way a particularly simple, durable and lightweight assembly for seat height-adjusting mechanisms is obtained.

I claim:

1. Vehicle seat comprising a seat part supported by a height-adjusting mechanism for adjusting the height of the cushion, the height-adjusting mechanism comprising:

at least one link member extending between, firstly, a first end adapted to be pivotally mounted in relation to the vehicle floor around a first pivot axis and, secondly, a second end connected to the seat part, and at least one control device comprising, firstly, a pinion which is rotatably mounted with respect to the seat part around an axis of rotation parallel to the first pivot axis and, secondly, a rack which is pivotally mounted with respect to the seat part around a second pivot axis parallel to the first pivot axis, said rack being formed by a rigid plate with two main faces perpendicular to the second pivot axis, said rack comprising a toothed portion forming an arc of a circle centered on said second pivot axis and meshing with the pinion, and the rack being mechanically linked to the second end of the link member so that rotation of the rack around the second pivot axis is translated into rotation of the link around the first pivot axis, wherein the pinion is rotatably mounted in a rigid yoke integrally connected to the cushion and comprising two rigid plates connected by a web, said two plates encasing the pinion substantially without free play along the second pivot axis and being arranged against the two main faces of the rack respectively, substantially without free play along said second pivot axis, wherein each of the two plates has first and second ends arranged on each side of the pinion, the first ends of the two plates being rigidly held in mutual contact outside the rack to form the web of the yoke, and the second end of the plates being connected together by at least one fixing element passing through an arcuate slot formed in the rack and centered on the second pivot axis, and wherein the yoke has at least one stop resting against an arcuate abutment edge centered on said second pivot axis and formed in the rack, said abutment edge facing away from the toothed portion of the rack.

2. Seat according to claim 1, wherein the second end of the link member is integral with the rack.

3. Seat according to claim 1, wherein the second end of the link member is pivotally mounted on the rack.

4. Seat according to claim 1, wherein the stop has an arcuate form complementary to the abutment edge.

5. Seat according to claim 1, wherein each plate rests against the corresponding main face of the rack on either side of the slot in said rack.

6. Seat according to claim 1, wherein the slot in the rack has a smooth arcuate edge forming said abutment edge, the two ends of the plates being in contact with each other and forming a rigid guide block engaging in said slot, the guide block having an outside edge forming said stop.

7. Seat according to claim 6, wherein the slot in the rack is delimited between the abutment edge and the toothed portion of said rack.

8. Seat according to claim 6, wherein the slot of the rack has an edge which faces towards the second pivot axis and in which the toothed section of said rack is formed, said rack having an outer edge forming said abutment edge, and the web of the yoke having an edge forming said stop.

9. Seat according to claim 1, wherein the toothed section of the rack projects radially towards the outside of said rack, the rack having a dished section forming an arcuate groove on one main face of the rack, said arcuate groove being centered on the second pivot axis, and said rack further including an arcuate rib on the opposite main face of said rack, said arcuate rib being centered on the second pivot axis, the second end of one of the plates having a projection engaging in the groove of the rack and resting radially at least against an edge delimiting said groove and facing away from the toothed section of the rack, and the second end of the other plate having an arcuate channel centered on the second pivot axis, said arcuate channel having an arcuate edge facing towards the toothed section of the rack and resting radially against an edge delimiting said rib, which edge of the rib faces away from the toothed section of the rack.

10. Seat according to claim 9, wherein the arcuate slot is formed in the dished portion of the rack.

11. Seat according to claim 1, wherein the height-adjusting mechanism includes at least one transverse linking bar extending between first and second ends which are pivotally mounted on the two side plates forming part of the seat cushion, the first end being formed integrally with said rack and the second end being connected to an additional link member intended to be pivotally mounted to the vehicle floor.

12. A control device for a height-adjusting mechanism in a vehicle seat, said control device comprising:

a rigid yoke comprising two rigid plates connected by a web, a pinion which is rotatably mounted in said yoke around an axis of rotation, said pinion being encased substantially without free play between the two plates of the yoke, a rack which is pivotally mounted on said yoke around a pivot axis which is parallel to said rotation axis, said rack being formed by a rigid plate with two main faces which are perpendicular to said pivot axis, said rack comprising a toothed portion forming an arc of a circle centered on said pivot axis and meshing with the pinion, the two plates of the yoke being arranged against the two main faces of the rack respectively, substantially without free play along said pivot axis, wherein each of the two plates has first and second ends arranged on each side of the pinion, the first ends of the two plates being rigidly held in mutual contact outside the rack to form the web of the yoke, and the second end of the plates being connected together by at least one fixing element passing through an arcuate slot formed in the rack and centered on said second pivot axis, and wherein said yoke has at least one stop resting against an arcuate abutment edge centered on said pivot axis and formed in the rack, said abutment edge facing away from the toothed portion of the rack.

* * * * *